United States Patent
Ghafourifar et al.

(10) Patent No.: US 11,860,929 B1
(45) Date of Patent: Jan. 2, 2024

(54) SYSTEM AND METHOD FOR UNIFYING FEATURE VECTORS IN A KNOWLEDGE GRAPH

(71) Applicant: Entefy Inc., Palo Alto, CA (US)

(72) Inventors: Alston Ghafourifar, Los Altos Hills, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 17/843,922

(22) Filed: Jun. 17, 2022

Related U.S. Application Data (63) Continuation of application No. 16/827,623, filed on Mar. 23, 2020, now Pat. No. 11,366,849, which is a continuation of application No. 15/859,078, filed on Dec. 29, 2017, now abandoned.

(51) Int. Cl.
*G06F 7/00* (2006.01)
*G06F 16/532* (2019.01)
*G06F 16/33* (2019.01)
*G06F 16/951* (2019.01)

(52) U.S. Cl.
CPC .......... *G06F 16/532* (2019.01); *G06F 16/334* (2019.01); *G06F 16/951* (2019.01)

(58) Field of Classification Search
CPC ..... G06F 16/532; G06F 16/334; G06F 16/951
USPC .................................................. 707/600–899
See application file for complete search history.

(56) References Cited

U.S. PATENT DOCUMENTS

| | | |
|---|---|---|
| 2002/0161747 A1 | 10/2002 | Li et al. |
| 2010/0205198 A1 | 8/2010 | Mishne et al. |
| 2019/0065594 A1* | 2/2019 | Lytkin ................... G06F 16/951 |

* cited by examiner

*Primary Examiner* — Isaac M Woo
(74) *Attorney, Agent, or Firm* — Haynes and Boone, LLP (57) ABSTRACT

Disclosed are apparatuses, methods, and computer readable media for improved multi-datatype searching comprising receiving a search query of a first datatype, generating a vector of the first datatype describing the search query, expanding the vector of the first datatype to include a second datatype vector, wherein the second datatype vector is different from the first datatype but may be conceptually equivalent, and wherein the second datatype is associated with the vector of the first datatype, and performing a search based on the first datatype and a search on the second datatype.

20 Claims, 9 Drawing Sheets

SYSTEM AND METHOD FOR UNIFYING FEATURE VECTORS IN A KNOWLEDGE GRAPH

CROSS REFERENCE TO RELATED APPLICATIONS

This application is a continuation of U.S. patent application Ser. No. 16/827,623, filed Mar. 23, 2020, which is a continuation of U.S. patent application Ser. No. 15/859,078, filed Dec. 29, 2017, all of which are incorporated by reference herein in their entirety.

TECHNICAL FIELD

This disclosure relates generally to apparatuses, methods, and computer readable media for a unified knowledge vector for improved multi-format search.

BACKGROUND

Machine learning and pattern recognition software system can be harnessed to perform various artificial intelligence tasks or services, such as object recognition, translation, and autonomous driving. These tasks or services may be based on a number of types of input, including speech, text, images, video, light detection and ranging (LIDAR), etc. Patterns may be determined to analyze and make inferences about the input. In certain cases, classifiers may be used to recognize various aspects of the input and the output of these classifiers may be organized as a vector. Vectors generally represent an item or concept as described by the classifiers. As an example, for a picture of a face, various classifiers trained to recognize specific facial features may be run to help identify a person in the picture. These classifiers may each output scores indicating how much the face matches with specific facial feature each classifier is trained to identify. These scores may be collected into a facial image vector and the facial image vector compared to a database of facial image vectors describing other face images to find a match. This comparison may be, for example, based on the output of clustering algorithms such as K-Nearest Neighbor (KNN) and other forms of analysis of vectors representing attributes detected between different facial images.

These comparisons work within single data type, but break down across different types of data since a vector describing a concept associated with a first data type may not accurately describe that same concept in a second data type. Additionally, the first data concept vector may represent relationship X with various other concept vectors in the first data space, whereas that same concept vector may not exist or may represent a different relationship Y with other concepts in the second data space. For an example, a vector representing an image of an intersection of two roads may be more closely related, for example as a part of a KNN analysis, to a curved road rather than two lines or objects intersecting each other. However, in text, a vector for an intersection may be more closely related to a crossing point or line than anything related to roads. Moreover, for the image data type, the physical location or angle of the image may influence the resulting vector describing the image. This in turn may influence the KNN analysis. For example, a particular image of an intersection may be partially occluded by a traffic sign for the intersection, which may result in the vector being more closely related to a merge traffic sign. Attempting to map this vector across data types into text may then point to a completely different concept than expected.

The subject matter of the present disclosure is directed to overcoming, or at least reducing the effects of, one or more of the problems set forth above. To address these and other issues, techniques for improved cross data search by enabling comparisons of feature vectors across data types are described herein.

DETAILED DESCRIPTION

Disclosed are apparatuses, methods, and computer readable media for improved searching across multiple data types. More particularly, but not by way of limitation, this disclosure relates to apparatuses, methods, and computer readable media for improved search using a single unified vector across multiple data types.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, VM, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "data type" refers to a classification of data. Examples of data types may include text, images, video, point clouds, objects, etc.

Figure 1:
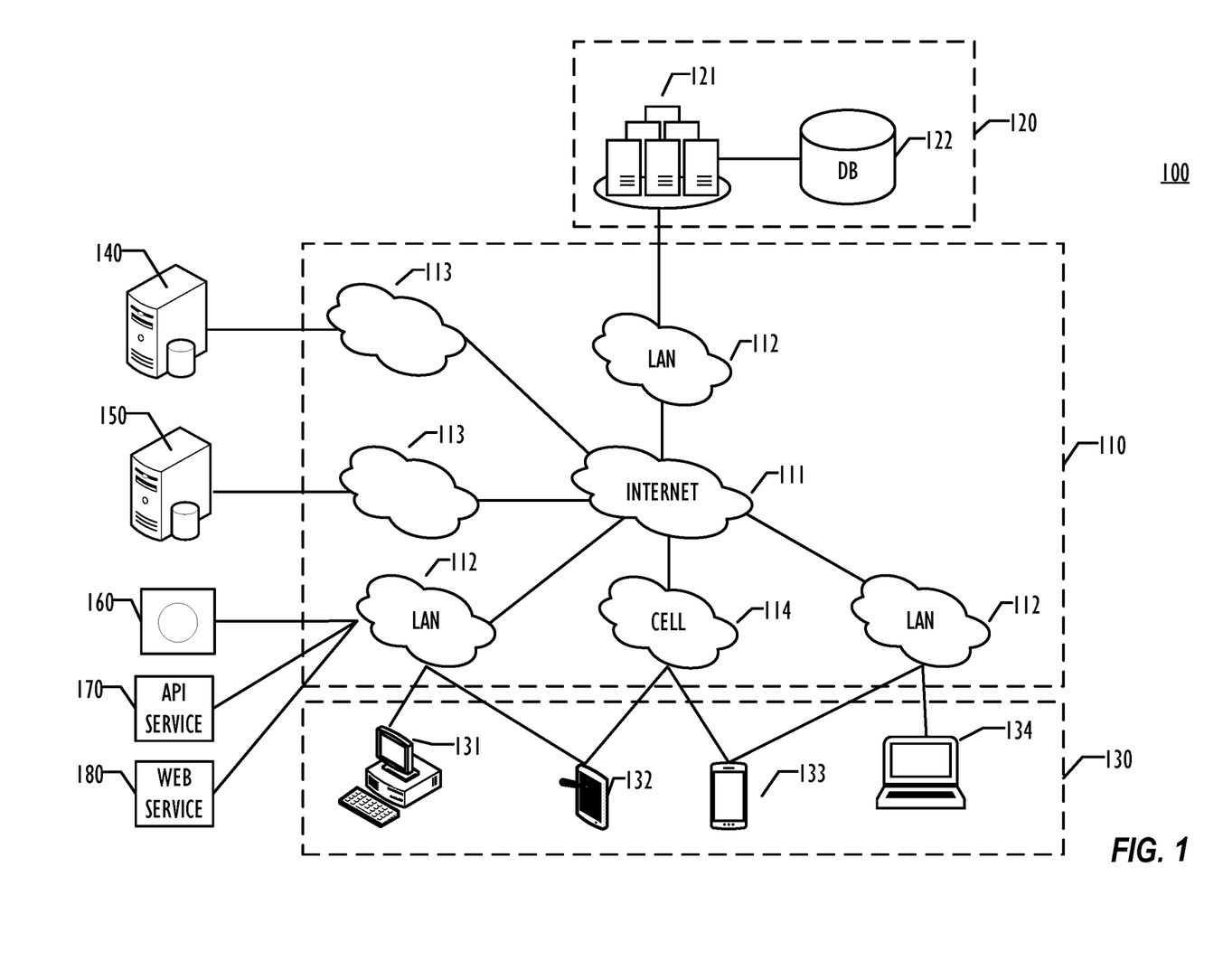
FIG. 1 is a block diagram illustrating a network architecture infrastructure, according to one or more disclosed embodiments.

Referring now to FIG. 1, a network architecture infrastructure 100 is shown schematically. The infrastructure 100 includes computer networks 110, interaction platform devices 120 (e.g., devices implementing a centralized communications system that allows users' client devices to seamlessly interact with any number of other client or third-party devices via any communications protocol and/or format), client devices 130, third-party communications devices 140, third-party service provider devices 150, smart devices 160, third-party 'API-enabled' services 170, and third-party 'Web-enabled' services 180.

The computer networks 110 may include any communications network that allows computers to exchange data, such as the internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices 120, the client devices 130, the third-party communications devices 140, the third-party service provider devices 150, the smart devices 160, the third-party 'API-enabled' services 170, and the third-party 'Web-enabled' services 180) via hardware elements such as gateways and routers.

The interaction platform devices 120 may include one or more servers 121 and one or more storage devices 122. The one or more servers 121 may include any suitable computer hardware and software configured to provide the features disclosed herein. The storage devices 122 may include any tangible computer-readable storage media including, for example, read-only memory (ROM), random-access memory (RAM), magnetic disc storage media, optical storage media, solid state (e.g., flash) memory, etc.

The client devices 130 may include any number of computing devices that enable an end user to access the features disclosed herein. For example, the client devices 130 may include, for example, desktop computers 131, tablet computers 132, mobile phone 133, notebook computers 134, etc.

The third-party communications devices 140 may include email servers such as a GOOGLE® email server (GOOGLE is a registered service mark of Google Inc.), third-party instant message servers, third-party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The third-party service devices 150 may include any number of computing devices that enable an end user to request one or more services via network communication. The smart devices 160 may include any number of hardware devices that communicate via any of the computer networks 110 and are capable of being controlled via network communication. The third-party 'API-enabled' services 170 may include any number of services that communicate via any of the computer networks 110 and are capable of being controlled via an Application Programming Interface (API), such as a ride-sharing service. The third-party 'Web-enabled' services 180 may include any number of services that may have no direct third-party interface, other than informational content, e.g., information hosted on a third-party web site or the like, such as a train schedule.

As described in more detail in the '157 application, the Universal Interaction Platform (UIP) allows users to interact with individuals, service providers, and smart devices 160 by sending a message (in the form of a message object) from a client device 130. The message object is output by the client device 130 for transmittal to the server 121. When the user is interacting with a service provider, the UIP may format an instruction for the third-party service device 150 associated with the service provider and output the instruction from the server 121 for transmittal to the third-party service device 150. Similarly, when the user is interacting with a smart device 160, the UIP may format an instruction for the smart device 160 and output the instruction from the server 121 for transmittal to the smart device 160. The server 121 may also receive a response from the third-party service device 150 or smart device 160, format a response message (e.g., in the form of a response message object) for the user, and output the response message object for transmittal to the client device 130.

Figure 2A:
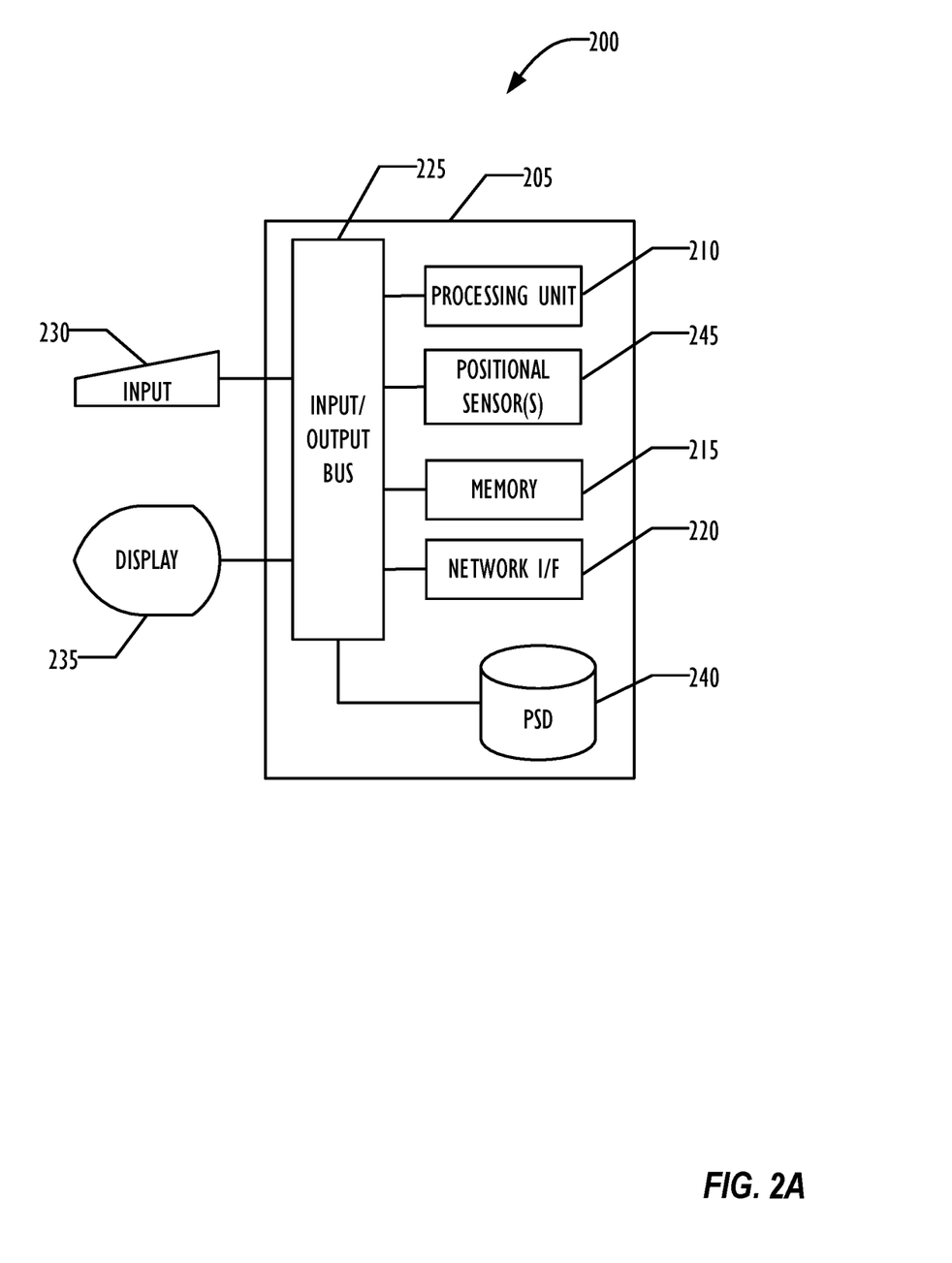
FIG. 2A is a block diagram illustrating a computer which could be used to execute the various processes described herein, according to one or more of disclosed embodiments.

Referring now to FIG. 2A, an example processing device 200 for use in the communication systems described herein according to one embodiment is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
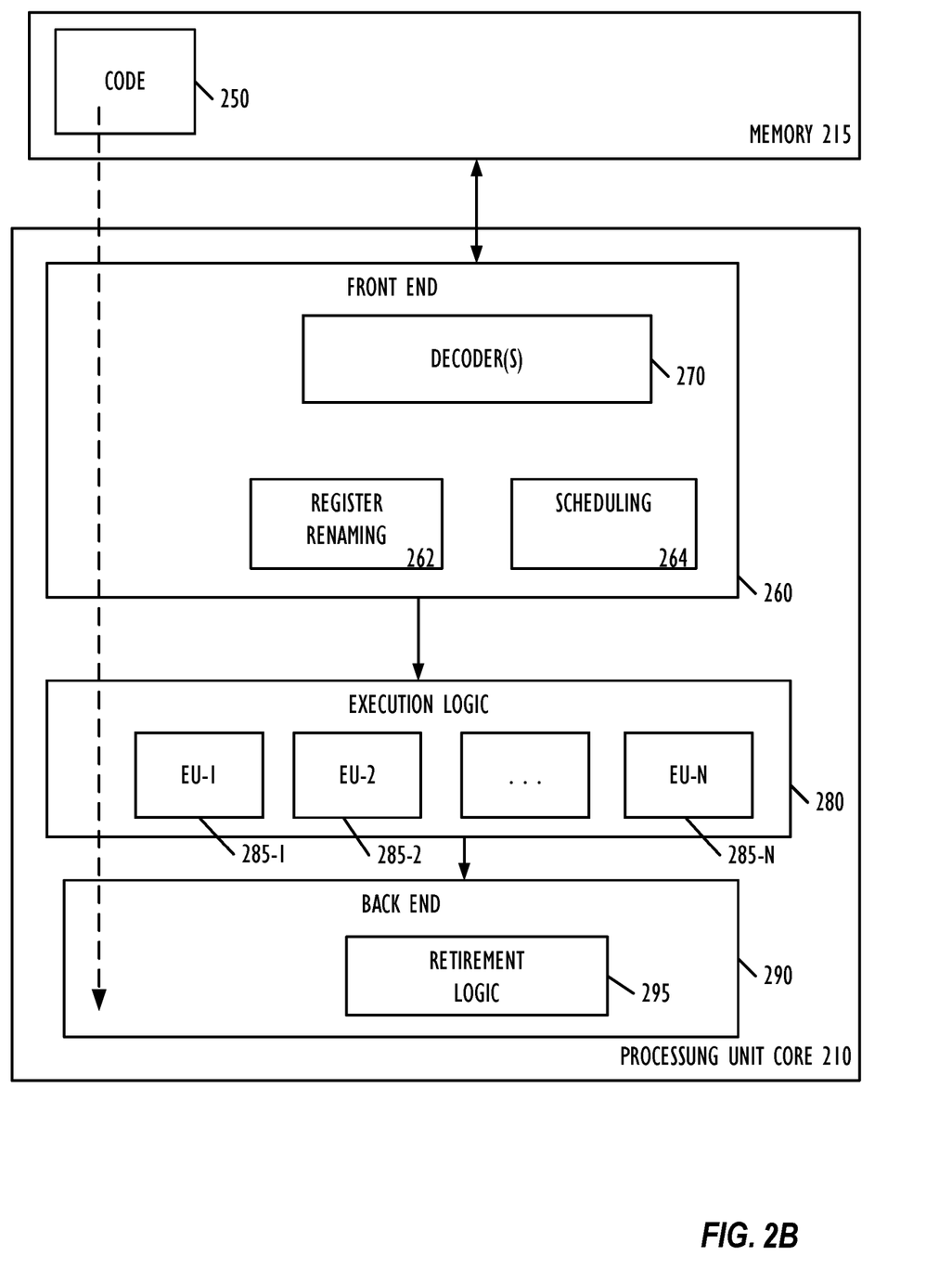
FIG. 2B is a block diagram illustrating a processor core, which may reside on a computer, according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Figure 3:
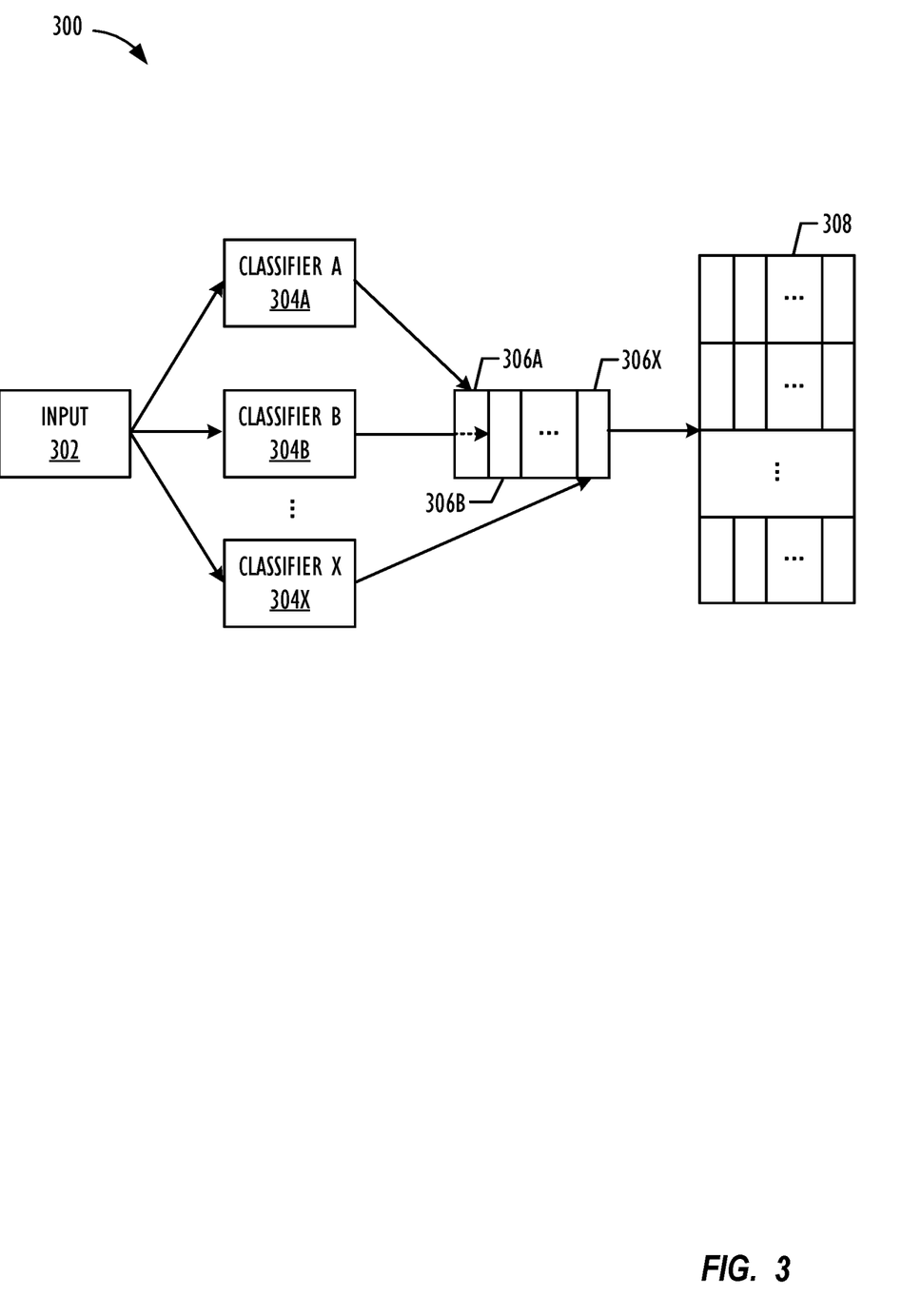
FIG. 3 is a block diagram of a media search service, according to one or more disclosed embodiments.

FIG. 3 is a diagram of a media search service 300, according to one or more disclosed embodiments. A search input 302 is received and the search input may be of, or specify a particular type of media type of the input, such as text, an image, video, audio, LIDAR point cloud, etc. This input may then be submitted to one or more classifiers 304A-304X (collectively referred to as classifiers 304). These classifiers 304 may be machine learning (ML) trained to recognize specific aspects about the data. For example, with image data, classifier A 304A may be trained to recognize low light conditions and classifier B 304B may be trained to recognize dogs.

Each classifier may output a score indicating the presence of certain conditions. For example, classifier B 304B may output a certain score when the image includes a dog and another score when no dog is present. Classifiers may also be chained. For example, for classifier B 304B, a score above a certain threshold may trigger another classifier or set of classifiers (not shown) to analyze dog breeds. The output scores of these classifiers may be grouped into a vector 306A-306X (collectively vector 306) describing the image. In certain cases, vector 306 may also describe relationships as between objects. For example, assuming that the image includes a dog, a classifier processing the image may be trained to recognize wolves and the resulting score may describe how close the dog appears to a wolf. As a textual example, classifiers may be trained based on how close the word being scored is found in relation to another word in sentences generally. Thus an input word, such as king, may be scored by classifiers trained on words man, woman, royalty, etc., and the resulting vector describes how the word king relates to those other words. The vector 306 may be compared to a vector database 308 and matches outputted. The vector database 308 may include previously trained vectors of insights. For example, for text, vectors for insights queen, royalty, elephant, etc. may be stored in the vector database 308. This comparison may be based how similar the vector 306 is to another vector in the vector database 308. For example, the vector obtained for the word king may be much more similar to a vector for the word queen, than for the word elephant and the word queen may be output as a match, for example, if the match is within a certain threshold distance.

Underlying the comparisons of the vectors is that the relationships between the objects, as reflected in the vectors, are consistent. For example, for text, scores making up a vector may reflect the distance between a word being scored and other words. For an image, scores making up a vector may reflect the presence of certain objects or object features within an image as compared to other images. Thus how similar the word king is to queen does not necessarily translate to a picture of a king and a picture of a queen. Even similar data types may generate relationship information that is very different and these difference makes comparisons across data types difficult. For example, video data may include motion vectors or time information for objects in the video making the resulting vectors different form that produced for a single frame of the video. Comparisons between these formats would be difficult for existing vector databases without restructuring and reprocessing the vector database.

Figure 4A:
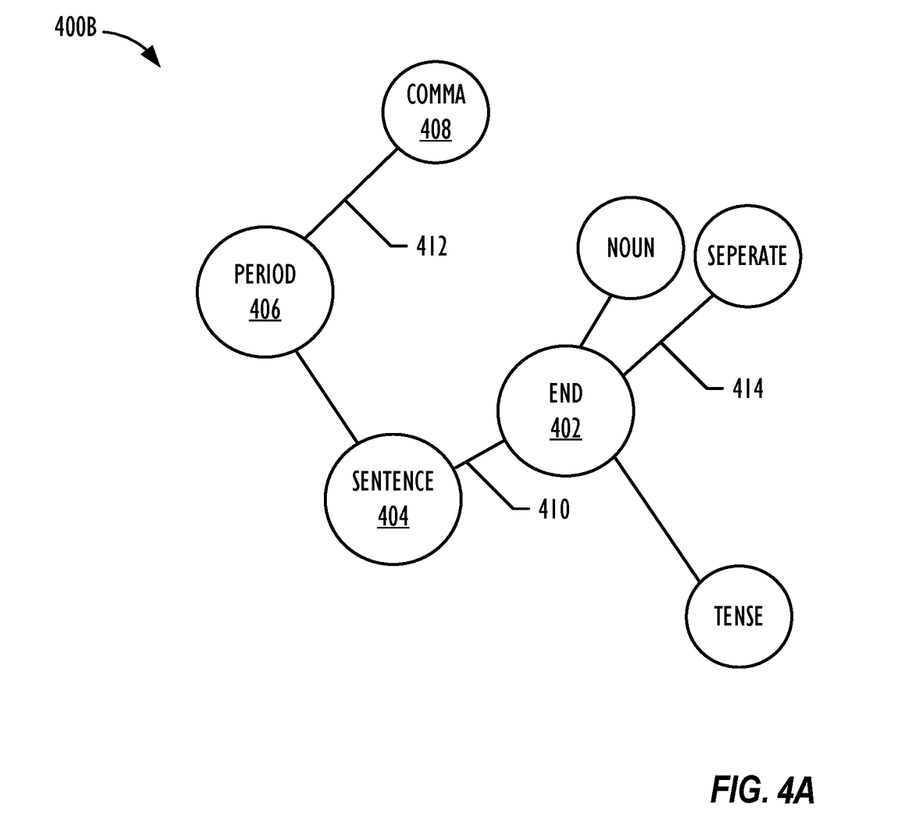
FIGS. 4A and 4B are diagrams illustrating vector relationships, according to one or more disclosed embodiments.
Figure 4B:
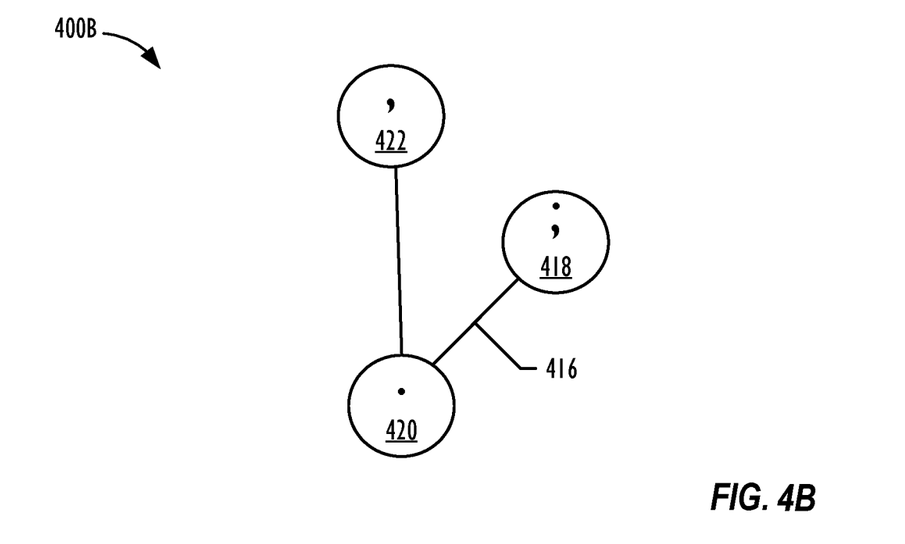

FIGS. 4A and 4B are graphs illustrating vector relationships 400A and 400B, according to one or more disclosed embodiments. Concepts and vectors may be represented in graph form. FIG. 4A is a graph of concepts and vectors for text data types. For text, concepts may be words and the vectors between concepts may describe the probability that two particular words are within N words of each other. Here End 402, may appear within N words of sentence 404, more often than period 406 and comma 408 as shown by vectors 410 and 412, respectively. Vectors describe the relationships between a first pair of concepts and similar vectors between a second pair of concepts may indicate that the first pair of concepts are related to the second pair of concepts. Here, vector 412 is similar to vector 414 as commas may separate clauses of sentences and periods end sentences.

FIG. 4B is a graph of concepts and vectors for image data types. Translating the text data type vector to an image data type vector is not likely to translate properly in the image vector domain. For example, translated to image space, vector 412 may be similar to vector 416. However, vector 416 may describe a relationship between images of a; 418 and a. 420, rather than, for example a period and a comma.

Unified Knowledge Vector

Figure 5:
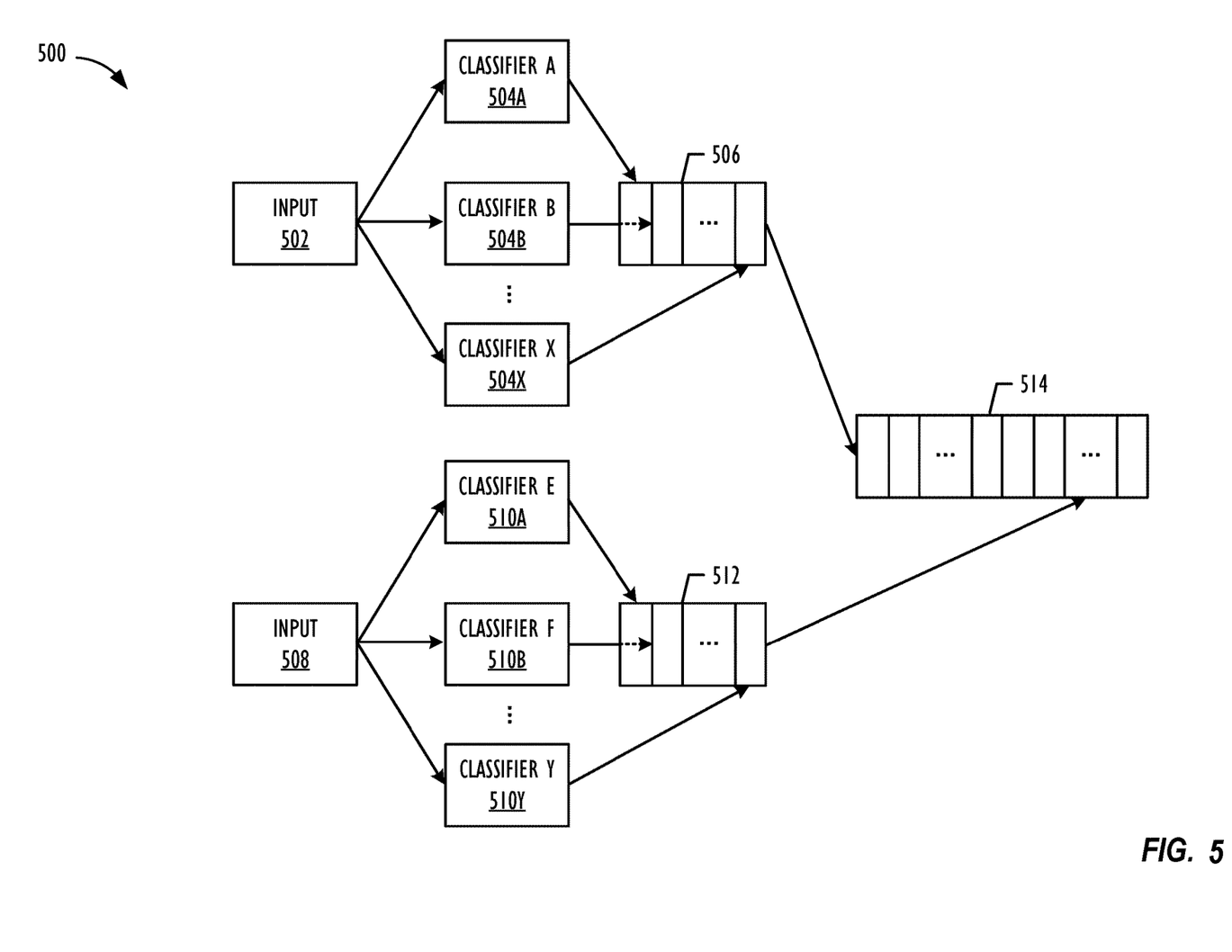
FIG. 5 is a block diagram illustrating a technique for generating a unified knowledge vector, according to one or more disclosed embodiments.

FIG. 5 is a block diagram illustrating a technique 500 for generating a unified knowledge vector, according to one or more disclosed embodiments. According to certain aspects, multiple data types for an insight, such as an intersection, may be separately trained to generate vectors for each data type and then merged into a single unified knowledge vector. By merging separately trained vectors, existing vector databases may be leveraged. A first training input 502 for an insight of a first data type may be processed by a set of classifiers 504A-504X for that data type to obtain a first vector 506. For example, for an insight such as an intersection, textual input may be processed by various classifiers to obtain a vector describing the textual input. A second training input 508 for the insight of a second data type may be processed another set of classifiers 510A-510Y for the second data type to obtain a second vector 512. Continuing the example, an image of an intersection may be processed to obtain a vector describing the image. The first vector 506 and the second vector 512 may then be joined to obtain a unified knowledge vector 514. In certain cases, the first vector 506 and the second vector 512 are from existing vector databases and the databases may be processed to obtain unified knowledge vectors.

Figure 6:
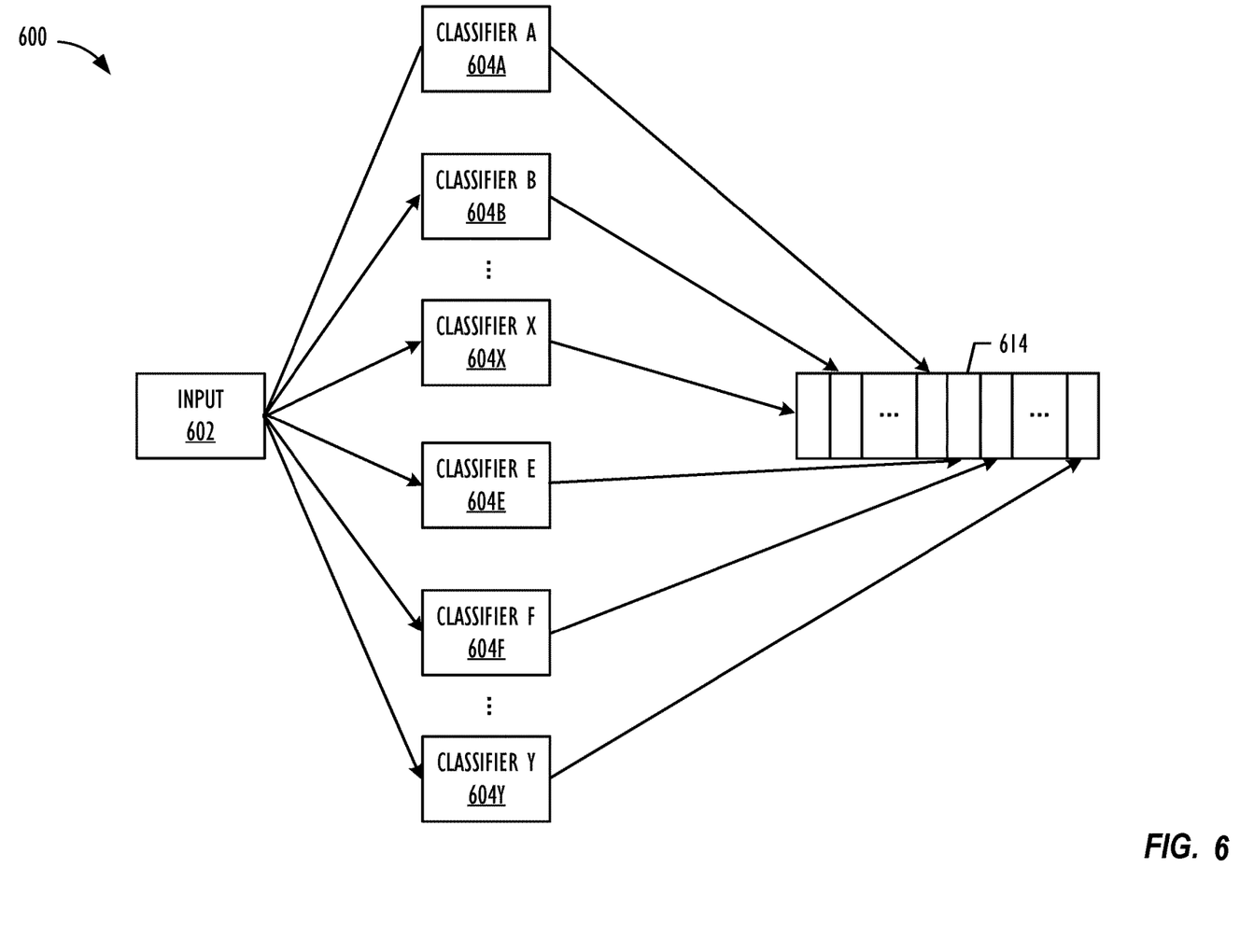
FIG. 6 is a block diagram illustrating a technique for generating a unified knowledge vector, according to one or more disclosed embodiments.

FIG. 6 is a block diagram illustrating a technique 600 for generating a unified knowledge vector, according to one or more disclosed embodiments. According to certain aspects, multiple data types for an insight, such as an intersection, may be trained by multi-layered classifiers for multiple data types together. As shown a training input 602 may be classified by classifiers 604A-604X and 604E-604Y together. Input 602 may contain multiple data types, for example, text and video of an intersection. Text may be extracted from the video and processed by classifiers 604A-604X, video processed by classifiers 604E-604Y, still frame images from another set of classifiers, and so forth. The output of the classifiers 604A-604X and 604E-604Y may be a unified knowledge vector 614.

Figure 7:
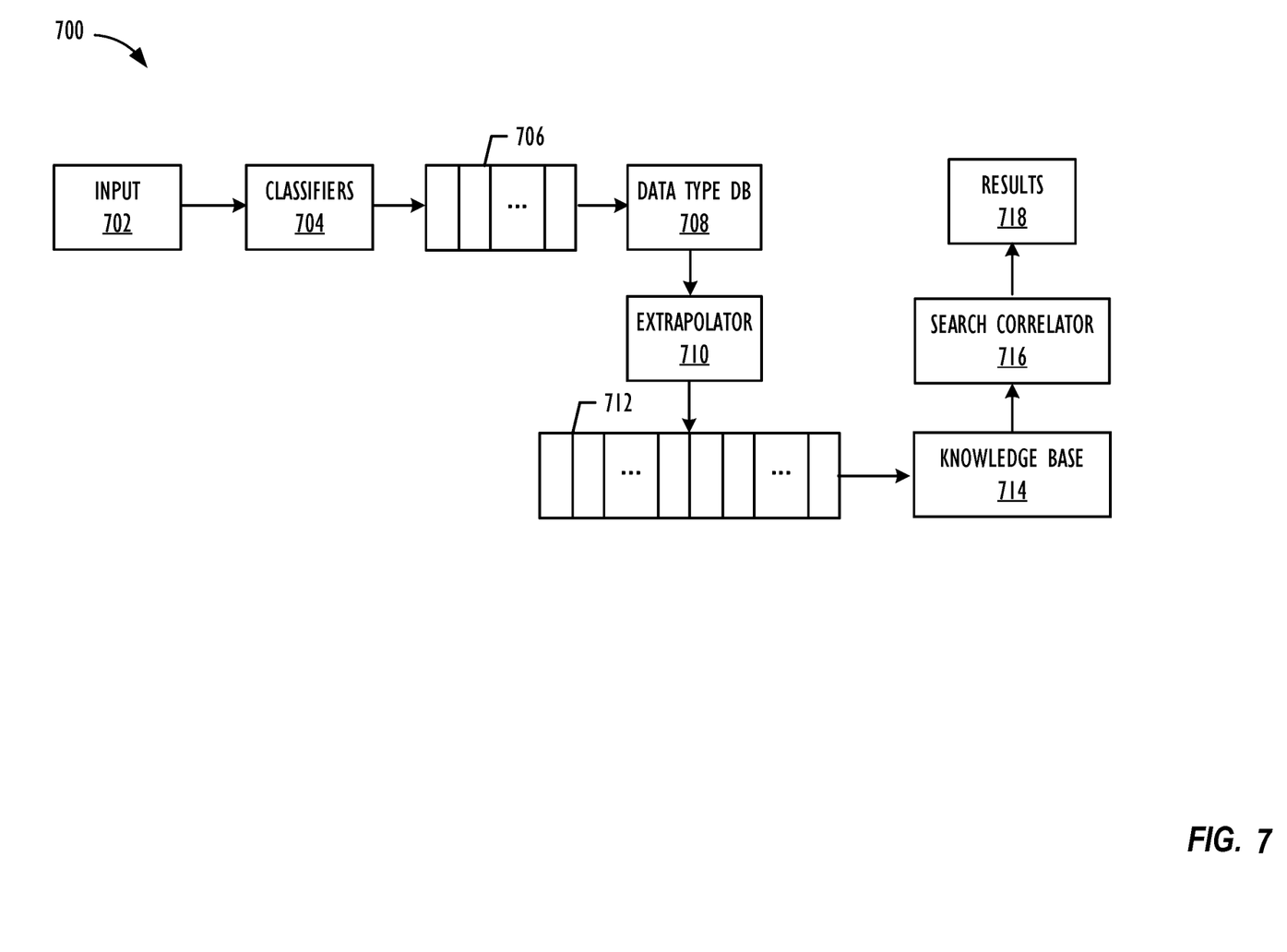
FIG. 7 is a block diagram illustrating a technique for searching a unified knowledge vector, according to one or more disclosed embodiments.

FIG. 7 is a block diagram illustrating a technique 700 for searching a unified knowledge vector, according to one or more disclosed embodiments. A search input 702 of a particular data type is received, classified by a set of data type classifiers 704 to produce a search vector 706 of the data type. The search vector is matched against a data type vector database 708 to identify a corresponding data type insight. For example, for a textual search on taco grande, text vectors for taco and grande may be generated and matched against text vectors portions of unified vectors corresponding to insights taco and grande. Based on the data type insight, the data type vector may be extrapolated to a unified vector 712 by a unified vector extrapolator 710. For example, the text vector for taco may be expanded based on the unified vector for taco and similarly for grande. Searches may then be performed using the various data type portions of the unified vector against a knowledge base 714 and correlated in a search correlator 716 one or more times to refine the search. For the example, nearest neighbor searches may be performed for taco as text, images, video, LIDAR, etc. may be performed based on various portions of the unified vector. The textual search may return, among other results, neighbors burrito, restaurant, and bell. A corresponding image search may return a lot of pictures of various pictures of tacos. The text search may then be refined to ignore or underweight the bell results and more heavily weigh burrito and restaurant results. Similarly, the search for grande may return text results for large, coffee, and restaurant, while LIDAR results may return point clouds tagged as buildings. Based on these results, restaurant results may be more heavily weighted. The results of the two terms may then be correlated and results for restaurants more heavily weighted. The correlated results may then be returned as search results 718.

Figure 8:
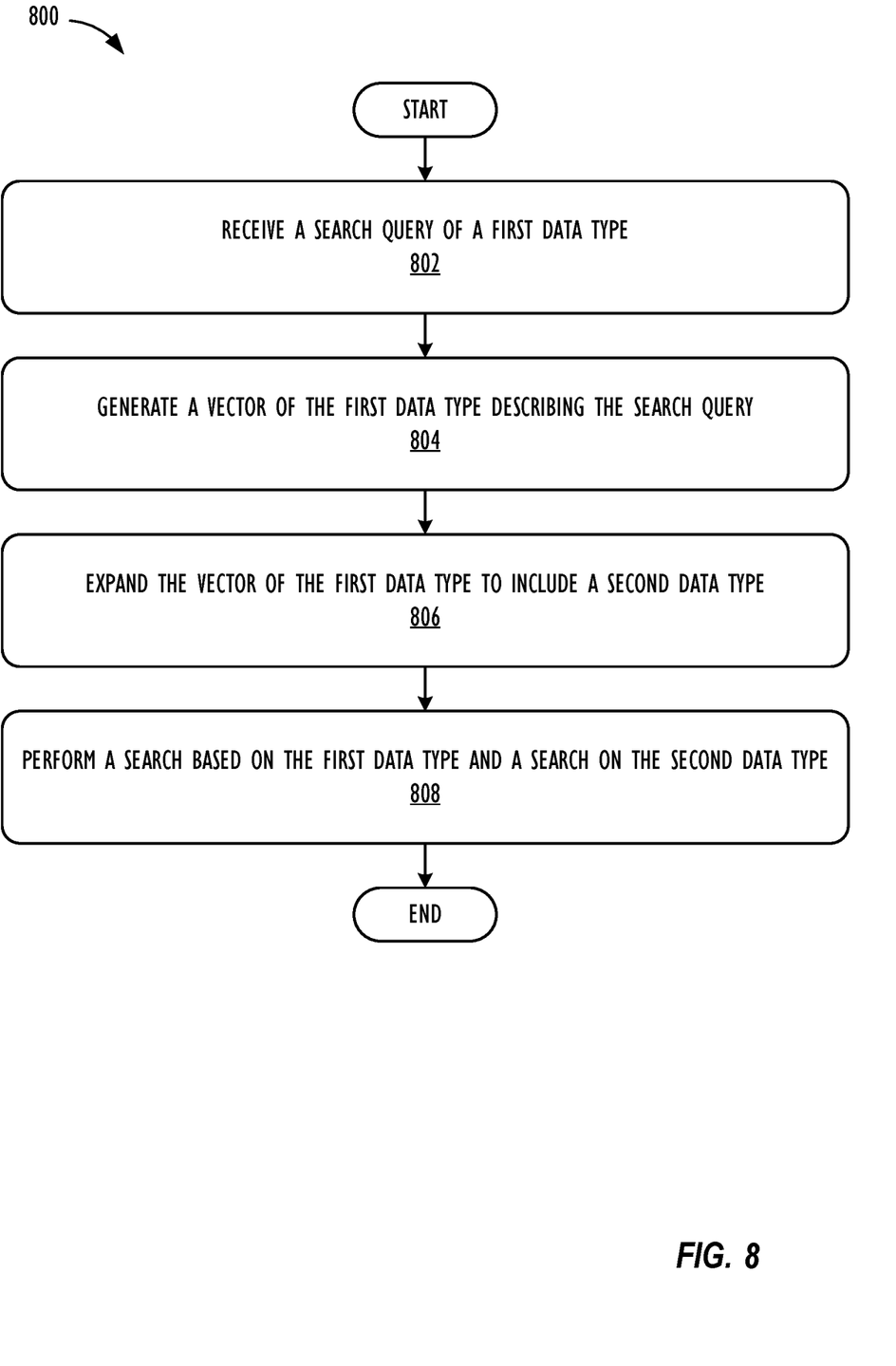
FIG. 8 is a flowchart for a method for multi data type searching, according to one or more disclosed embodiments.

FIG. 8 is a flowchart for a method 800 for multi data type searching, according to one or more disclosed embodiments. At block 802, a search query is received. The search query may be of a discrete data type, such as text, an image, video, sensor stream, etc. At block 804, a vector of the search query for the corresponding data type may be generated. According to certain aspects, the search query may be analyzed by one or more classifiers. These classifiers may be machine learning trained classifiers for identifying aspects of the search query and the output of the classifiers may be used to construct a data type vector describing the search query. At block 806, the data type vector may be expanded to include at least another data type, the other data type of a different data type than the search query. For example, the data type vector may be matched against corresponding data type portions of unified vectors. Where a match is found the data type vector may be expanded based on the match. The expanded vector may include multiple data types, including data types not in the original search query. At block 808, perform a search based on the first data type and a search on the second data type.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A system for multi-data type searching, comprising:
   one or more non-transitory memory devices; and
   one or more hardware processors configured to execute instructions from the one or more non-transitory memory devices to cause the system to perform operations comprising:
      receiving a search query comprising a data type of a plurality of data types;
      obtaining a first vector of a plurality of vectors for a first object of the search query;
      obtaining a second vector of the plurality of vectors for a second object of the search query;
      generating a unified knowledge vector of the search query from the first vector and the second vector of the plurality of vectors, the plurality of vectors being extrapolated to the unified knowledge vector by a unified knowledge vector extrapolator based on an association between the first and second objects in the search query;
      performing a search based on the unified knowledge vector, wherein the performing the search includes:
         comparing the unified knowledge vector to one or more vectors in a vector database, and
         producing one or more outputs that match the unified knowledge vector from the one or more vectors in the vector database;
      performing an additional search using the plurality of data types and the unified knowledge vector;
      correlating the one or more outputs based on one or more times to refine the additional search; and
      weighting a result of the search based on the correlated one or more outputs associated with the refined additional search.

2. The system of claim 1, wherein the one or more outputs are associated with different ones of the plurality of data types, and wherein the operations further comprise:
   applying a weighting of the one or more outputs based on the different ones of the plurality of data types resulting from performing the search.

3. The system of claim 1, wherein the comparing the unified knowledge vector to the one or more vectors in the vector database comprises performing a nearest neighbor search using different portions of the unified knowledge vector with the one or more vectors in the vector database.

4. The system of claim 1, wherein the first object and the second object for the search query each comprise one of an insight, a concept, or a relationship within the search query, and wherein the search query comprises one of a search image or a plurality of search terms.

5. The system of claim 1, wherein the vector database comprises previously trained vectors for the plurality of vectors, and wherein the previously trained vectors are each associated with one of the plurality of data types.

6. The system of claim 1, wherein, prior to obtaining the first vector, the operations further comprise:
   classifying each of the plurality of data types using a chained classifier,
   wherein the first vector and the second vector are obtained based on the classified plurality of data types.

7. The system of claim 6, wherein the chained classifier comprises at least two classifiers connected in a chain or a multi-layered classifier configured for training multiple data types, and wherein the search query comprises a text, an image, a video, an audio, or a LIDAR point cloud corresponding to one of the plurality of data types.

8. The system of claim 6, wherein the operations further comprise:
   determining that a score for one of the plurality of data types from the classifying using the chained classifier meets or exceeds a threshold score; and
   applying an additional classifier to the one of the plurality of data types.

9. A method for multi-data type searching, comprising:
   receiving a search query comprising a data type of a plurality of data types;
   obtaining a first vector of a plurality of vectors for a first object of the search query;
   obtaining a second vector of the plurality of vectors for a second object of the search query;
   generating a unified knowledge vector of the search query from the first vector and the second vector of the plurality of vectors, the plurality of vectors being extrapolated to the unified knowledge vector by a unified knowledge vector extrapolator based on an association between the first and second objects in the search query;
   performing a search based on the unified knowledge vector, wherein the performing the search includes:
      comparing the unified knowledge vector to one or more vectors in a vector database, and
      producing one or more outputs that match the unified knowledge vector from the one or more vectors in the vector database;
   performing an additional search using the plurality of data types and the unified knowledge vector;

correlating the one or more outputs based on one or more times to refine the additional search; and weighting a result of the search based on the correlated one or more outputs associated with the refined additional search.

10. The method of claim 9, wherein the one or more outputs are associated with different ones of the plurality of data types, and wherein the method further comprises:

applying a weighting of the one or more outputs based on the different ones of the plurality of data types resulting from performing the search.

11. The method of claim 9, wherein the comparing the unified knowledge vector to the one or more vectors in the vector database comprises performing a nearest neighbor search using different portions of the unified knowledge vector with the one or more vectors in the vector database.

12. The method of claim 9, wherein the vector database comprises previously trained vectors for the plurality of vectors, and wherein the previously trained vectors are each associated with one of the plurality of data types.

13. The method of claim 9, wherein, prior to obtaining the first vector, the method further comprises:

classifying each of the plurality of data types using a chained classifier, wherein the first vector and the second vector are obtained based on the classified plurality of data types.

14. The method of claim 13, wherein the chained classifier comprises at least two classifiers connected in a chain or a multi-layered classifier configured for training multiple data types, and wherein the search query comprises a text, an image, a video, an audio, or a LIDAR point cloud corresponding to one of the plurality of data types.

15. The method of claim 14, wherein the operations further comprise:

determining that a score for one of the plurality of data types from the classifying using the chained classifier meets or exceeds a threshold score; and applying an additional classifier to the one of the plurality of data types.

16. A machine-readable medium, on which are stored instructions for allocating hardware resources, comprising instructions that when executed cause a machine to:

receive a search query comprising a data type of a plurality of data types;

obtain a first vector of a plurality of vectors for a first object of the search query;

obtain a second vector of the plurality of vectors for a second object of the search query;

generate a unified knowledge vector of the search query from the first vector and the second vector of the plurality of vectors, the plurality of vectors being extrapolated to the unified knowledge vector by a unified knowledge vector extrapolator based on an association between the first and second objects in the search query;

perform a search based on the unified knowledge vector, wherein performing the search includes:

comparing the unified knowledge vector to one or more vectors in a vector database, and producing one or more outputs that match the unified knowledge vector from the one or more vectors in the vector database;

perform an additional search using the plurality of data types and the unified knowledge vector;

correlate the one or more outputs based on one or more times to refine the additional search; and weight a result of the search based on the correlated one or more outputs associated with the refined additional search.

17. The machine-readable medium of claim 16, wherein the one or more outputs are associated with different ones of the plurality of data types, and wherein the instructions, when executed, further cause the machine to:

apply a weighting of the one or more outputs based on the different ones of the plurality of data types resulting from performing the search.

18. The machine-readable medium of claim 16, wherein comparing the unified knowledge vector to the one or more vectors in the vector database comprises performing a nearest neighbor search using different portions of the unified knowledge vector with the one or more vectors in the vector database.

19. The machine-readable medium of claim 16, wherein the first object and the second object for the search query each comprise one of an insight, a concept, or a relationship within the search query, and wherein the search query comprises one of a search image or a plurality of search terms.

20. The machine-readable medium of claim 16, wherein, prior to obtaining the first vector, the instructions, when executed, further cause the machine to:

classify each of the plurality of data types using a chained classifier;

determine that a score for one of the plurality of data types from the classifying using the chained classifier meets or exceeds a threshold score; and apply an additional classifier to the one of the plurality of data types, wherein the first vector and the second vector are obtained based on the classified plurality of data types.

* * * * *